United States Patent [19]

Frischmann et al.

[11] Patent Number: 4,676,406
[45] Date of Patent: Jun. 30, 1987

[54] SQUIRT CARTRIDGE FOR MIXING AND DISPENSING A TWO-COMPONENT MASS

[75] Inventors: Albert Frischmann, Kenzingen; Kurt Mermi, Teningen; Peter Ziereisen, Gundelfingen, all of Fed. Rep. of Germany

[73] Assignee: Upat & Co., GmbH, Emmendingen, Fed. Rep. of Germany

[21] Appl. No.: 912,667

[22] Filed: Sep. 29, 1986

Related U.S. Application Data

[63] Continuation of Ser. No. 679,917, Dec. 10, 1984, abandoned.

[30] Foreign Application Priority Data

Dec. 10, 1983 [DE] Fed. Rep. of Germany ....... 8335529

[51] Int. Cl.[4] ............................................. B67D 5/56
[52] U.S. Cl. ..................... 222/136; 16/225; 16/DIG. 13; 222/135; 222/145; 222/327; 222/386; 366/256; 366/332; 604/89
[58] Field of Search ............ 222/129, 135-137, 222/145, 325, 326, 327, 386, 190; 366/332, 333, 256, 258, 259; 604/82, 89; 16/225, DIG. 13; 206/219, 220; 215/DIG. 8

[56] References Cited

U.S. PATENT DOCUMENTS

| | | | |
|---|---|---|---|
| 1,388,042 | 8/1921 | Hunter | 416/64 |
| 1,836,026 | 12/1931 | Helle | 366/256 |
| 1,954,143 | 4/1934 | Morrison | 416/64 |
| 2,020,638 | 11/1935 | Feltault | 366/332 |
| 2,123,118 | 7/1938 | Osborn et al. | 366/256 |
| 2,166,437 | 7/1939 | Howie et al. | 366/96 |
| 2,281,094 | 4/1942 | Chambers | 366/332 X |
| 2,831,606 | 4/1958 | Alters | 222/1 |
| 3,140,078 | 7/1964 | Krahe et al. | 222/386 X |
| 3,144,966 | 8/1964 | Cook | 222/386 X |
| 3,202,310 | 8/1965 | Tibbets | 16/225 X |
| 3,217,946 | 11/1965 | Cook | 222/386 |
| 3,437,242 | 4/1969 | Poitras | 222/386 X |
| 3,489,147 | 1/1970 | Shaw | 222/137 X |
| 3,707,146 | 12/1972 | Cook et al. | 604/96 X |

FOREIGN PATENT DOCUMENTS

| | | |
|---|---|---|
| 2800587 | 1/1983 | Fed. Rep. of Germany . |
| 2447875 | 11/1981 | France . |
| WO82/03212 | 9/1982 | PCT Int'l Appl. . |

*Primary Examiner*—Joseph J. Rolla
*Assistant Examiner*—Kevin P. Shaver
*Attorney, Agent, or Firm*—Frishauf, Holtz, Goodman & Woodward

[57] ABSTRACT

A dispenser for storing, mixing and dispensing two components. A casing contains the first component and has a piston therein. A mixing tube containing the second component is axially housed in the casing and has an open end sealed by the piston until mixing of the two components is desired. The mixing tube has a mixing plate adjacent the open end to agitate and mix the two components. The mixing plate comprises arms extending from the mixing with flapping vanes attached on one side of each arm.

14 Claims, 9 Drawing Figures

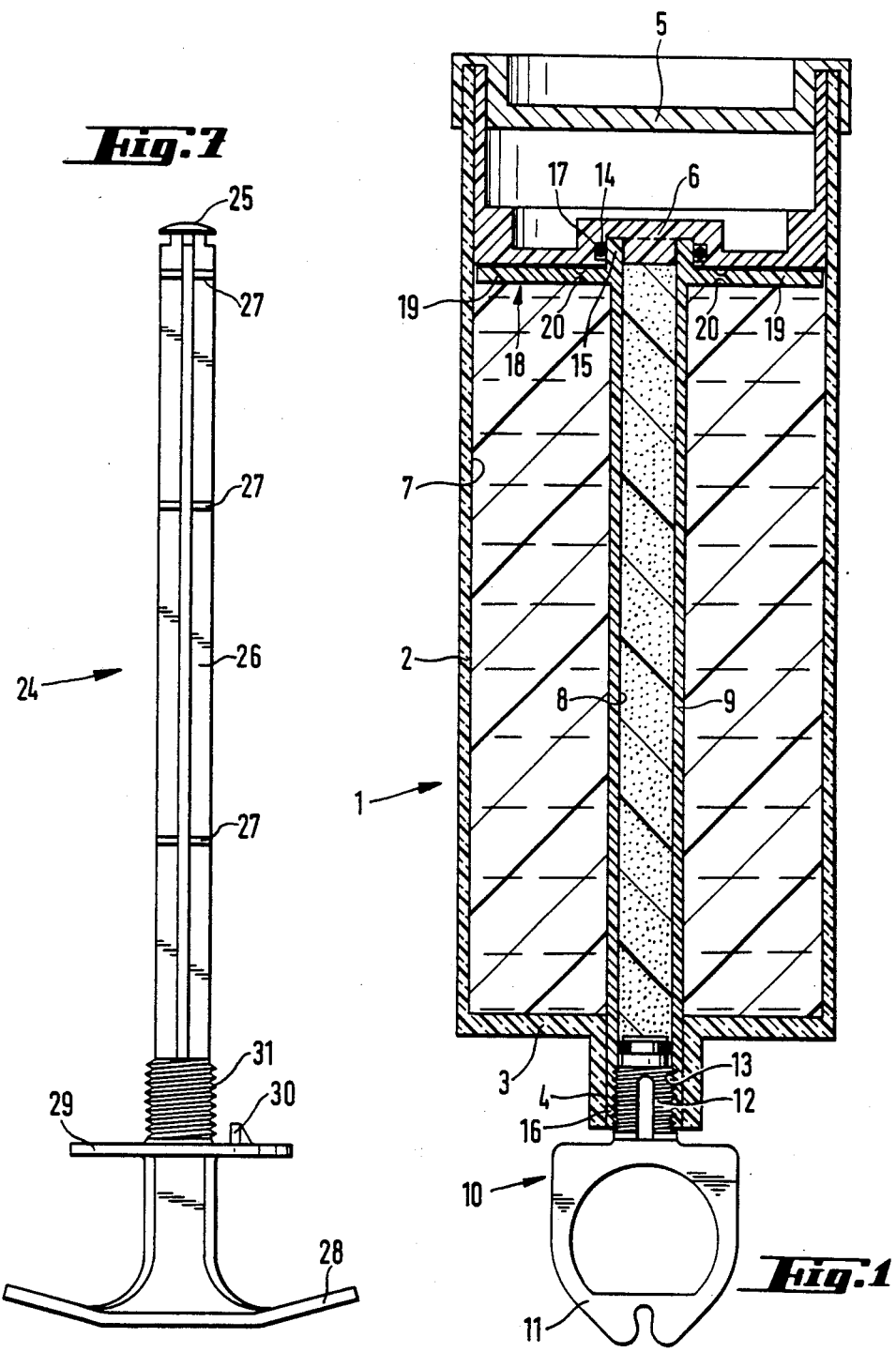

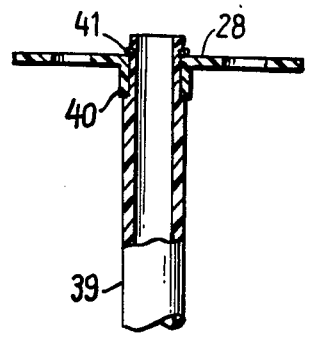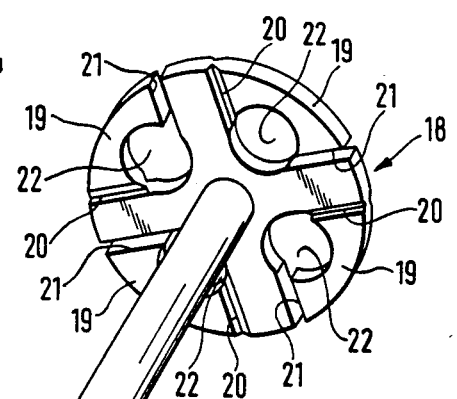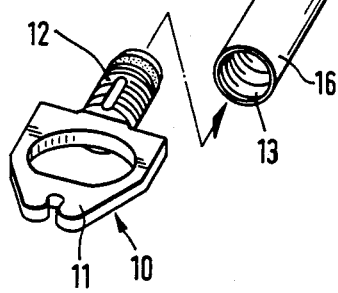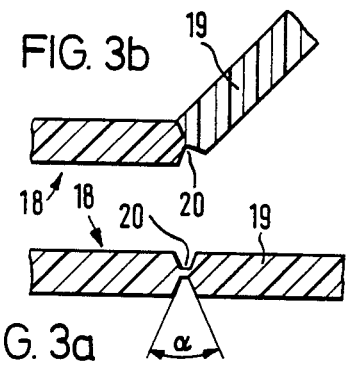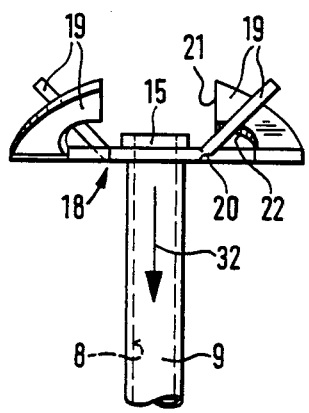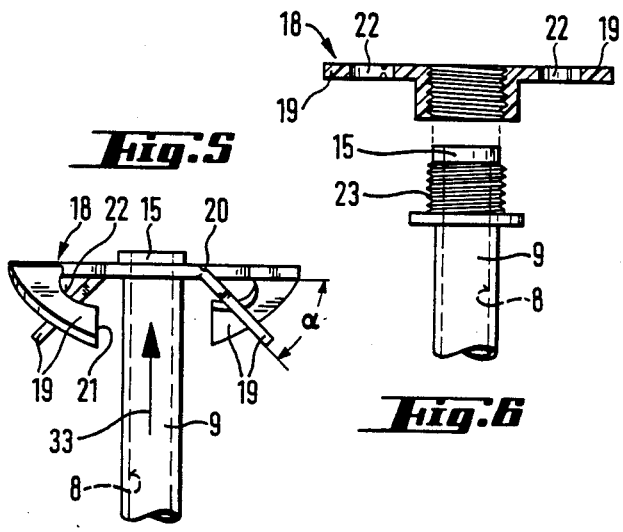

SQUIRT CARTRIDGE FOR MIXING AND DISPENSING A TWO-COMPONENT MASS

This application is a continuation of application Ser. No. 679,917, filed Dec. 10, 1984, now abandoned.

This invention concerns a squirt cartridge for mixing and dispensing a two-component mass, for example a resin and a hardener which are both fluid and at least one of which has considerable viscosity. Such cartridges typically have a cylindrical casing for containing a first component and having a dispensing piston therein intended to be acted upon by a rod or piston of a pistol-grip device and a mixing tube that serves as the chamber for the second component and carries a mixing device at its end towards the dispensing piston. Such a squirt cartridge, known from U.S. Pat. No. 3,144,966, is utilized to distribute a hardening adhesive or mortar in a bore and to fasten in the bore an anchor bolt set therein by means of the adhesive or mortar. The known cartridge has a casing that is to a great extent rigid and has at its rear end a guideway for a dispensing piston and at its front end the guideway for a mixing tube, the latter being equipped at its eternally projecting end with a grip for back-and-forth movement of the mixing tube. The mixing tube is constituted as a hollow chamber and can in this way contain one of the two components of the mass to be dispensed. At the rear end of the tubular mixing rod thus provided is a four-bladed propeller with mixing vanes. A disadvantage of this known cartridge is that a great residual mass remains in the casing after its use.

Another cartridge with a cylindrical casing is described in German Pat. No. P 28 00 587. The casing of this cartridge also is equipped with an orifice for guiding the mixing tube. At the end near the dispensing piston, a mixing device is affixed to the mixing tube which consists of a ring with four spokes, between which there is free passage. It is hardly possible, however, with the mixing device of spoked configuration, to obtain a complete mixing-up in a reasonable time, since the components are only briefly separated in the neighborhood of the spokes during axial movement of the mixing tube and remain in a laminar layer configuration behind the mixing device. It has also been found that the components are not sufficiently mixed in the wall regions of the cartridge. For this reason, it is necessary to mix for a long time, a procedure which is, however, quite problematical in the treatment of a quick-hardening mixture.

SUMMARY OF THE INVENTION

It is an object of the present invention to provide a squirt cartridge of the general type above described constituted for improved mixing-up of the components in which the residual mass left in the cartridge after its use will be held to a minimum.

Briefly, the mixing device moved axially on the mixing tube is constituted as a flat mixing baffle plate having movable mixing flaps or vanes attached thereto which can flap back and forth, at least over a limited angular swing. The mixing plate is equipped with at least two movable mixing vanes which are connected to the plate by means of flexible foil or sheet hinges which are preferable integral with the vanes and plate. The foil hinges are preferably so shaped that the flap-over of the mixing vanes upward and downward out of the plane of the mixing plate cannot exceed 45°.

According to the viscosity of the components to be mixed, free passages may be provided through the mixing vane plate. In a modification of the invention, the mixing vane plate is mounted on the mixing tube in a manner that permits rotation of the plate about the tube axis. In that manner the mixing plate is allowed to be automatically turned in the mixing operation propelled by axial movement of the tube. Other suitable elaborations and features of the invention are described in what follows:

BRIEF DESCRIPTION OF THE DRAWINGS

The invention is further described by way of illustrative example with reference to the annexed drawings, in which:

FIG. 1 is a longitudinal section of a squirt cartridge in accordance with the invention;

FIG. 2 is a perspective view of the mixing tube of the squirt cartridge of FIG. 1 with the mixing baffle plate 18 and its mixing flaps;

FIG. 2A is a perspective view of a screw-in stopper for the mixing tube shown in FIG. 2;

FIG. 3a is a detail on a larger scale, shown in section, of the foil hinge of a mixing vane tab of FIG. 2 in the position of the hinge shown in FIGS. 1 and 2;

FIG. 3b is a section like FIG. 3a showing the vane at maximum displacement from the position shown in FIG. 3a;

FIG. 4 is a side view of the mixing tube with the mixing vane in the case of a movement away from the dispensing piston of the squirt cartridge;

FIG. 5 is a representation similar to FIG. 4 for a movement in the direction towards the dispensing piston;

FIG. 6 is an exploded side view, partly in section, illustrating a screw connection between the mixing plate and the mixing tube;

FIG. 7 is a side view of the mixing rod for pressing the second component out of the mixing tube and for actuating the mixing tube; and FIG. 8 is a side view, shown in section, illustrating a variation of the connection of the mixing plate to the mixing tube.

DESCRIPTION OF THE ILLUSTRATED EMBODIMENT

The squirt cartridge shown in longitudinal section in FIG. 1 has a cylindrical casing 2 which is closed by an end wall 3 forming a transition into a tubular orifice 4, at the end which is downwardly located in FIG. 1. The end wall 3 has a flat internal surface.

At the end opposite the tubular orifice 4, the casing is provided with a removable cap 5 which is removed before the insertion of the squirt cartridge 1 into a dispensing pistol (not shown), so that the piston of the dispensing pistol can be pressed against the dispensing piston 6 of the cartridge.

The dispensing piston 6 is located in the upper position shown in FIG. 1 when the cartridge is filled and forms a boundary of an annular chamber 7 provided for containing a first component, for example a resin, and of a cylindrical chamber 8 inside and coaxial with the chamber 7 which is formed by the interior space of a mixing tube 9 and serves for containing a second component, for example a hardener for the resin in the chamber 7.

The mixing tube 9, at its end 16 extending downwards in FIG. 1, guided for displacement in the tubular orifice 4, is closed off by a screwed-in stopper 10 on which an integral grip member 11 is provided for manipulation. The mixing tube 9 has internal threads 13 corresponding to the external threads 12 of the stopper.

The end 15 of the mixing tube 9, shown extending upwards in FIG. 1, penetrates into a cavity having a ring groove 14, provided in the dispensing piston 6, whereby a ring seal 17 is produced for making a sealed separation between the cylindrical chamber 8 and the annular chamber 7.

As can be discerned in FIGS. 1 and 2, a mixing vane plate 18 is provided in the neighborhood of the upwardly shown end 15 of the mixing tube 9. The mixing vane plate 18 is provided, by way of example, in the illustrated case, with four mixing vanes 19, as shown in FIG. 2. The mixing vane plate 18 is offset from the end 15 in the direction of the end 16 of the tube 9 to such an extent that when the end 15 engages into the ring groove 14, the mixing vane plate 18 comes into abutment against the side of the dispensing piston 6 that faces the annular chamber 7.

In this manner the first component in the annular chamber 7 and the second component in the cylindrical chamber 8 are separated, so that there is no risk that the hardener in the cylindrical chamber 8, for example, should get into the annular chamber 7 and then harden the resin contained in the latter chamber.

The mixing vanes 19 are tabs swingably connected to the mixing vane plate 18 by foil hinges produced by reducing the thickness of the plate to a thin flexible foil along the hinge line, as shown in FIG. 3. In the initial position illustrated in FIG. 1, the mixing vanes lie in the plane of the mixing vane plate 18, so that they occupy very little space in the interior of the squirt cartridge 1. Both the edge of the mixing vane 19 connected by the foil hinge 20 and the free edge 20 of the vane run along portions of a chord crossing the substantially disk-shaped mixing vane plate 18. The mixing vanes are more or less in the shape of sectors of which the inward painting apices, however, lie displaced outward from the midpoint of the disk-shaped mixing vane plate 18. In the case of high viscosity of the components stored in the squirt cartridge 1, which are to be mixed in the manner further described below, it is advantageous to provide passages 22 through the mixing vane plate 18 in the region of the apices of the sector-shaped mixing vanes 19. These passages can for example be constituted by round perforations, as shown at 22 in FIG. 2.

The connection of the mixing vane plate 18 with the mixing tube 9 can be constituted in the manner shown in FIG. 1, where these two parts are made integral with each other and thus constitute an inseparable combination.

In an embodiment illustrated in FIG. 6, threads 23 are provided at the end of the mixing tube 9 where the mixing plate 18 is located, so that the latter can be screwed into place. The threading 23 is righthanded or lefthanded according to whether the mixing vanes 19 are connected to the left or to the right by foil hinges, so that in the mixing process described below, the threaded connection between the mixing vane plate 18 and the mixing tube 9 is not loosened.

In still another embodiment, shown in FIG. 8, the mixing vane plate 18 can be mounted so that it can freely rotate on the mixing tube 9, so that during a mixing operation the mixing vane plate 18 and the vanes 19 are put into rotation.

FIGS. 3a and 3b are a cross-section through the foil hinge 20. As can be seen in FIG. 3a a wedge-shaped groove of the profile angle α is provided on both sides of the hinge 20, so that the mixing vane 19 is limited to an angle of, for example, 45° in its deviation in the manner shown in the left portion of FIG. 3b. *The maximum deviation or buckling of the mixing vanes 19 away from the mixing tube is shown respectively in FIGS. 4 and 5.*

In the use of the squirt cartridge 1, the casing 2 of which is preferably made of a transparent or translucent plastic, the mixing tube 9 is first pulled out of the casing tube for about half its length by pulling on the trip 11. The rear end 15 of the tube 9 thus comes out of engagement with the ring groove 4. Furthermore, the mixing vanes 19 swing into the flap position illustrated in FIG. 4 as the result of the movement of the mixing tube 9.

In preparation of the mixing operation, the grip 11, and with it the stopper 10, are screwed out of the front end 16 of the mixing tube 9. Immediately thereafter the mixing rod 24 illustrated in FIG. 7 is pressed into the cylindrical chamber 8 of the mixing tube 9 and is screwed into the latter by means of an external threading 31 on the rod and internal threading 13 on the tube 9. The plunger 25 provided at the end of the mixing rod 24 presses the second component stored in the mixing tube 9 out of the tube 9 so that a mixing-up of the two components begins.

As can be seen in FIG. 7, the mixing rod 24 has a shaft 24 composed of two strips running at right angles to each other and provided with reinforcing ribs 27.

It can further be seen from FIG. 7 that the mixing rod 24 is provided with a grip 28 associated with a stop plate 29 and a stop pin 30. After screwing the mixing rod 24 into the mixing tube 9, the latter, along with its mixing plate 18, is moved by pushing in and pulling out the grip 28 of the mixing rod 4 in a reciprocating movement illustrated by the arrows 31 and 32 in FIGS. 4 and 5. During these axial movements of the mixing tube 9, the mixing vanes 19 flap back and forth in the manner shown in FIGS. 4 and 5 by the pressure of the components to be mixed. During the reciprocating movement of the mixing tube 9, the mixing vanes 19 are flapped back and forth in opposite directions, producing attack surfaces which are oblique to the mixing plate 18, so that the components to be mixed are strongly whirled. The components are futhermore circularly moved in the squirt cartridge 1. Although in the case of a mixing vane plate 18 screwed fast to the mixing tube 9 no rotation of the mixing plate 18 is produced, the mixing plate 18 does rotate when it is merely fitted onto the mixing tube 9 so that it is free to turn in response to rotary forces.

When the contents of the squirt cartridge 1 are uniformly mixed, for example by 25 axial mixing strokes, the mixing tube 9 is fully pulled out until the mixing vane plate comes into abutment with the flat internal face of the end wall 3. In this position of the tube 9, the mixing rod 24 is unscrewed out of the tube, so that the mixing tube 9 can be used as a syringe tube with a passage channel for the mixed mass of the two components. After removal of the cover cap 5, the squirt cartridge 1 thus prepared is laid into a dispensing pistol and the ejection of the mix components is begun, while the dispensing piston 6 of the cartridge is moved in the direction towards the wall 3. When the dispensing piston 6 finally comes to lie against the mixing plate 18, the mixing vanes 19, if they happen still to be sticking out, are pressed into the plane of the plate 18 so that the entire mass can be pressed out and only slight quantities of the mixed mass remain unused in the casing 2. By the use of the mixing vane plate 18 with movable flaps 19, the residue of the mass remaining in the squirt cartridge 1 is limited to a minimum since the flapped-out mixing vanes 19 can be shaped back into their original orientation by the pressure of the dispensing piston 6.

FIG. 8 shows the previously mentioned modification in which the mixing plate 28, although axially movable by the mixing tube 39, is mounted rotatably on the latter between a shoulder 40 and a split ring 41 in a groove 42.

Although the invention has been described with reference to the illustrated embodiments, it will be understood that variations and modifications a are possible within the inventive concept.

What is claimed is:

1. Squirt cartridge for mixing and dispensing a fluid mass of two components, including a mixing tube having an axis and an open end, a cylindrical casing coaxial with said mixing tube for containing a first component of said mass in which a dispensing piston is held, when said casing is filled, adjacent to a first end of said casing, said piston having, on its face directed away from said first casing end, means for sealing the open end of said mixing tube, said open end of said mixing tube and said means for having corresponding mating surfaces for fitting tightly against one another, said mixing tube having an interior chamber for containing a second component of said mass, and further comprising:

a flat mixing plate mounted on said mixing tube at right angles thereto and adjacent to but axially spaced from the open end of said tube said mixing plate having a fitting against said piston, when said open end is sealed by said means for sealing, said mixing plate comprising arms extending away from said mixing tube to which mixing vanes are attached at one side of said arms in a position offset from said mixing tube by attachment means permitting a flapping movement of said vanes a predetermined maximum angular magnitude of deflection said arms and said mixing vanes having stop means at said attachment means for limiting the flapping movement of said mixing vanes to about axes of swing defined by said attachment means.

2. Squirt cartridge according to claim 1, wherein said piston has a cylindrical skirt on its side facing towards said first end of said casing for guiding said piston in said casing; and a protective cap having an annular groove for said first end of said casing, said skirt and said first end of said casing fitting within said groove for preventing movement of said piston before use thereof.

3. Squirt cartridge according to claim 1, wherein said attachment means are foil hinges.

4. Squirt cartridge according to claim 1, wherein said mixing plate (18), to which said vanes (19) are attached, is fixedly mounted on said mixing tube (9).

5. Squirt cartridge according to claim 1, wherein said mixing plate (18) carrying said movable vanes (19) is mounted on said mixing tube (9) by means permitting rotation of said plate (18) about said tube (9).

6. Squirt cartridge according to claim 1, wherein said mixing plate has a configuration of a circular disc.

7. Squirt cartridge according to claim 1, wherein said sealing means comprises a cylindrical cavity in said face of said piston having a peripheral wall, a ring groove (14) in said peripheral wall of said cavity and a seal ring (17) in said groove for contact with the periphery of said mixing tube at said open end.

8. Squirt cartridge according to claim 7, wherein said open end of said mixing tube is received in said cavity, and said cavity includes a plug for fitting into said open end of said mixing tube.

9. Squirt cartridge according to claim 1 wherein said cylindrical casing, at a second end opposite said first end, has an end wall with a flat internal surface against which said mixing plate is positioned when said cartridge is emptied, said end wall having a central aperture therein, and a tubular extension defining an extension of said aperture for slidably holding said mixing tube.

10. Squirt cartridge according to claim 9, wherein said mixing tube is capable of being drawn outwardly through said central aperture of said end wall of said casing, said mixing tube having a second end opposite said open end, said second end having internal threads for accepting a closure plug, said closure plug having a manipulation grip for removing the plug from the second end of the mixing tube; and implement for insertion into the second end of the mixing tube and for ejecting said second component of said mass out of said casing containing said first component of said mass, said implement having a grip, and a threaded portion for engaging said internal threads of said second end of said mixing tube.

11. Squirt cartridge according to claim 1, in which said stop means are oblique surfaces provided on said vanes and on said mixing plate in the region of said attachment means.

12. Squirt cartridge according to claim 11, wherein said stop means permit flapping movement of said vanes within an angular range of 90°.

13. Squirt cartridge according to claim 1, wherein said mixing plate has apertures therein defined between said arms and said vanes for permitting free-passage, past said mixing plate, of the mass of said two components cartridge during axial movement of mixing tube and said mixing plate.

14. Squirt cartridge according to claim 13, in which said apertures are circular openings in said mixing plate.

* * * * *